March 9, 1965 E. L. ALLEN ETAL 3,172,512
POSITIONING MEANS FOR WIRE WRAPPING TOOL
Filed March 7, 1962 2 Sheets-Sheet 1

INVENTORS
EDWARD L. ALLEN
JOHN A. MOORE
BY
THEIR ATTORNEY

March 9, 1965   E. L. ALLEN ETAL   3,172,512
POSITIONING MEANS FOR WIRE WRAPPING TOOL Filed March 7, 1962   2 Sheets-Sheet 2

INVENTORS
EDWARD L. ALLEN
JOHN A. MOORE
BY
*Arthur Frederick*
THEIR ATTORNEY

United States Patent Office 3,172,512
Patented Mar. 9, 1965

3,172,512
POSITIONING MEANS FOR WIRE
WRAPPING TOOL
Edward L. Allen, Ulster, and John A. Moore, South Montrose, Pa., assignors to Ingersoll-Rand Company, New York, N.Y., a corporation of New Jersey
Filed Mar. 7, 1962, Ser. No. 178,024
6 Claims. (Cl. 192—3)

The present invention relates to automatic tools for wrapping wire about a member, such as an electrical terminal, and more particularly pertains to a pneumatically driven wire wrapping tool having means for automatically positioning the bit in a home or starting position after each successive operation of the tool.

Presently known pneumatically or electrically driven wire wrapping tools, having means for bringing the bit to a home position after each operation of the tool, are provided with a clutch mechanism interposed between the spindle and the motor. One such wire wrapping tool is provided with a stop shoulder on the spindle disposed to coact with a trigger stop member to "home" the tool upon disengagement of a clutch mechanism. In this apparatus the rotational inertia of the spindle and bit is relied upon to provide continued rotation of the spindle after disengagement of the clutch mechanism, so that the stop shoulder on the spindle engages the trigger stop member. However, it was found that when the trigger stop member was released in relation to the angular position of the spindle so as to immediately engage the stop shoulder, the spindle rebounded upon impact against the trigger stop member and a loose end wrap or "pig tail" occurred.

To overcome this problem, the tools have been provided with relatively complex means for effecting positive rotation of the spindle after disengagement of the spindle from the source of rotary power. In the aforementioned apparatus, a drag ring or slip clutch was provided between the spindle and the motor to frictionally drive the spindle when the clutch mechanism was disengaged to effect reengagement of the spindle with the trigger stop member after rebound of the spindle. Another means by which it was attempted to overcome the aforementioned problem is disclosed in U.S. Patent No. 2,884,685 to Bos et al. In this apparatus a spring is employed to store, by being "wound," rotary power during the wrapping operation of the tool so that, after disengagement of the clutch mechanism, the spindle is rotated in a reverse direction by the spring to engage a stop member, such as a pawl or rod. The disadvantage of such mechanisms is their relative complexity and the attendant problems of assembly, adjustment, wear, and replacement of parts, as well as opening of the wrap or coil of wire by reason of reverse rotation of the spindle.

Another disadvantage of pneumatically driven tools of the type disclosed in U.S. Patent No. 2,884,685 is that the device fails to obtain maximum efficiency since the clutch mechanism only effects coupling of the spindle to the motor after more than ¼ revolution of the motor. It has been found that an air motor, deriving its torque from differential in air pressures, accelerates to full operational r.p.m. in approximately ¼ revolution of the rotor, and, therefore, any greater amount of rotation without producing work is wasted energy.

Accordingly, it is an object of the present invention to provide a pneumatically driven wire wrapping tool of relatively simple, inexpensive construction which is more efficient and easier to maintain than conventional air operated wire wrapping tools.

Another object of this invention is to provide, in a pneumatically driven wire wrapping tool, for automatically stopping the bit in a predetermined home or starting position after each successive operation without disengaging the bit from the pneumatic motor.

A further object of the present invention is to provide a pneumatically driven wire wrapping tool wherein operation of the pneumatic motor is stopped substantially simultaneously with the halting of the bit in a predetermined home or starting position.

A still further object of this invention is to provide a pneumatically driven wire wrapping tool wherein the need for a clutch mechanism to engage and disengage the bit from the pneumatic motor is obviated.

The invention, therefore, contemplates a novel pneumatically driven wire wrapping tool which comprises a bit adapted to receive a wire to be wrapped, which bit is connected for rotation to a spindle, the spindle being rotatably driven, through a gear reduction assembly, by a pneumatic motor. A throttle valve is provided to control flow of pressure fluid from a suitable source thereof to the pneumatic motor. A stop means, including a camming surface and stop member, is rotatably carried by the spindle, while a cam follower is supported for movement to engage and disengage from the camming surface and stop member. A manually operable means is connected to said cam follower and the throttle valve for simultaneously causing, in one operative position, the throttle valve to open and the cam follower to disengage from the camming surface and stop member and, in another operative position, allow re-engagement of the cam follower with the camming surface and the throttle valve to close as the cam follower rides along the camming surface, the throttle valve fully closing substantially simultaneously with the cam follower engaging the stop member.

The invention will be more fully understood from the following detailed description thereof when considered in connection with the accompanying drawings wherein one embodiment of the invention is illustrated by way of example and in which.

Figure 1:
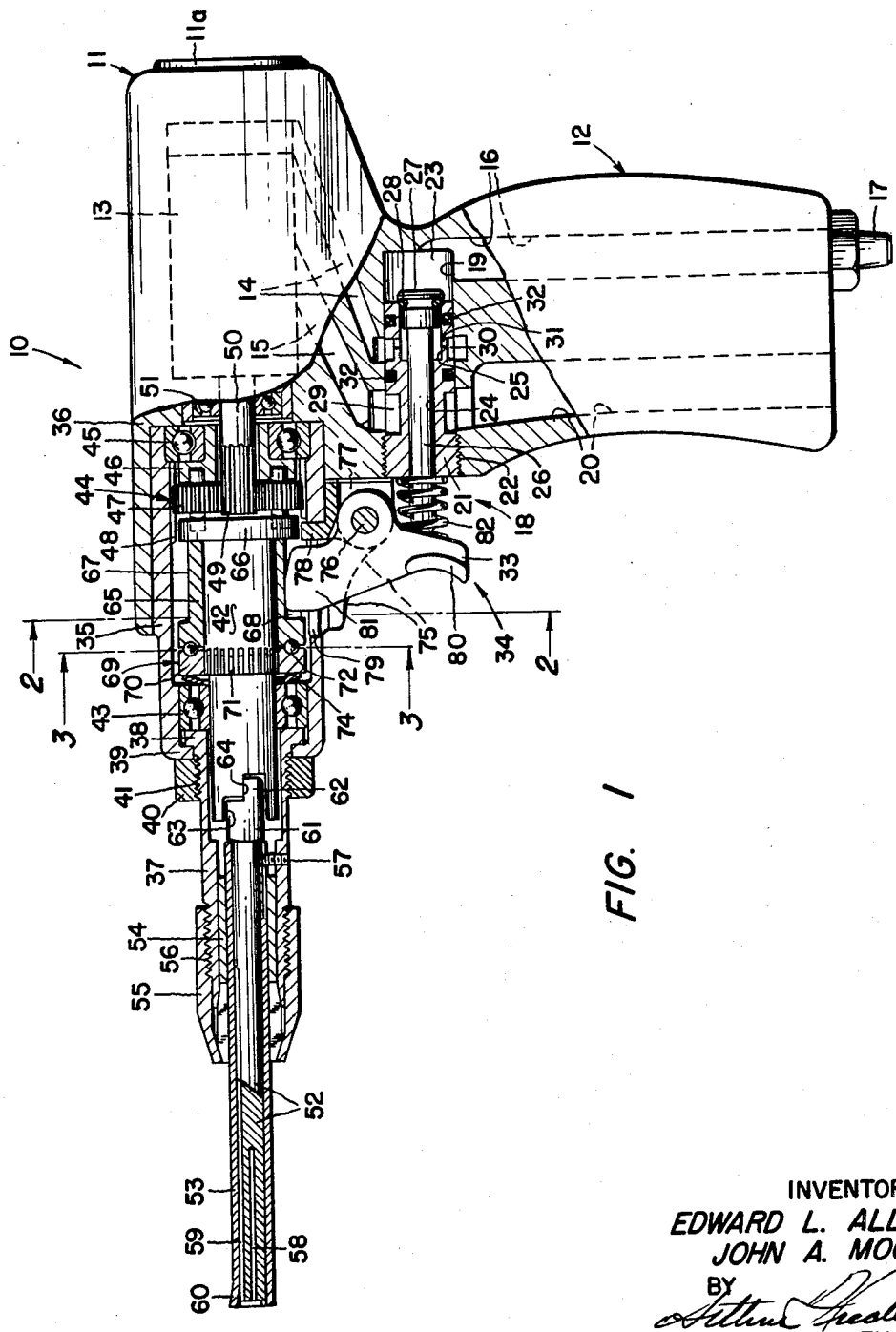
FIG. 1 is a side view of a wire wrapping tool according to this invention with parts broken away for purposes of illustration.

Referring to the drawings and more specifically to FIG. 1, the reference numeral 10 designates the wire wrapping tool according to this invention which comprises a cylindrical housing 11 and an integral handle 12. While handle 12 is shown as an integral part of housing 11, it may be a separate member suitably joined to housing 11 by screws or bolts. In addition, housing 11 may be constructed of two sections suitably connected together without departing from the scope and spirit of this invention. As shown, housing 11 is open at both ends with the rear end opening closed by a closure member 11a.

An air motor 13 of any suitable type, such as reciprocating vane type air motor, is disposed within the rear portion of housing 11. Pressurized air is supplied to air motor 13 through a passageway 14 formed partly in housing 11 and handle 12, while spent air is exhausted from air motor 13 through a passageway 15 which is also partly formed in housing 11 and handle 12.

Handle 12 is provided with a pressurized air inlet passageway 16 which communicates with a suitable source of compressed air through a hose (not shown) connected to a hose connection 17 secured in handle 12. The opposite end of passageway 16 communicates with a throttle valve assembly 18 which is disposed in a recess 19 formed in the upper portion of handle 12. An exhaust passageway 20 is provided in handle 12 adjacent to and parallel with passageway 16. Exhaust passageway 20 communicates at one end with recess 19 and with the atmosphere at the opposite end thereof.

The throttle valve assembly 18 comprises a valve cage or plug member 21 which is threadably secured at 22 within recess 19. The inner end of valve cage 21 is spaced from the bottom of recess 19 to define with the latter an air inlet chamber 23. Valve cage 21 has an axial bore 24 which is counterbored at 25. A valve stem 26, having a valve head 27, is disposed for axial movement within bore 24. The valve head 27 has an O-ring seal 28 which seats against a valve seat formed around the peripheral edge of counterbored portion 25 of bore 24 when the valve is in the closed position, as shown. Valve cage 21 is provided with an annular groove 29 which registers with exhaust passageways 15 and 20 so that communication between the latter passageways is effected. Another annular groove 30 is formed in the valve cage 21 so as to register with passageway 14. A plurality of ports 31 are provided in valve cage 21 to communicate annular groove 30 with counterbored portion 25 so that, when the valve head 27 is unseated by axial movement to the right as viewed in FIG. 1, chamber 23 is brought into communication with the counterbored portion 25 and compressed air is allowed to flow from chamber 23, into counterbored portion 25 and thence, through ports 31 and annular groove 30, into passageway 14. From passageway 14, the compressed air passes to air motor 13 to cause operation of the latter. A pair of O-ring seals 32 are seated in a pair of annular grooves in the peripheral surface of valve cage 21 on opposite sides of groove 30 to seal the interstices between the valve cage 21 and recess 19 and prevent compressed air from by-passing valve 27 or by-passing air motor 13 by flow from groove 30 to groove 29. Valve stem 26 extends from the end of valve cage 21 to engage a manually operable control means in the form of a trigger 33 of a trigger assembly 34, which trigger 33, when actuated, causes valve stem 26 to move axially to the open position. The trigger assembly 34 will be hereinafter more fully described.

In the forward end portion of housing 11 is coaxially disposed a cylindrical spindle housing 35. Spindle housing 35 is dimensioned in length to abut an internal annular flange 36 and to extend from the forward open end of housing 11 a short distance. A spindle housing extension 37, having a flanged end 38, is disposed in the forward end of spindle housing 35 with flanged end 38 in abutment against an inwardly extending annular flanged end 39 of spindle housing 35. Spindle extension 37 is secured to spindle housing 35 by a lock nut 40 which is turned upon threads 41, formed in the peripheral surface of the spindle extension, to draw flanged end 38 tight against the flanged end 39 of the spindle housing.

A spindle 42 is supported for rotation within spindle housing 35 by a bearing 43 and, through a speed reduction assembly 44, by a bearing 45. Gear reduction assembly 44 comprises planetary pinion gears 47, the shafts of which are supported at one end in spindle 42 and the opposite end in a member 46, member 46 being rotatably supported in spindle housing 35 by bearing 45. Gears 47 are disposed in meshing relationship with an internal gear 48 formed on the inner peripheral surface of spindle housing 35 and a drive gear 49 formed on the end of the rotor shaft 50 of motor 13. Rotor shaft 50 projects through an axial bore in member 46 and is supported for rotation by a bearing 51 secured within annular flange 36 of housing 11. With air motor 13 in operation, rotor shaft 50 is rotated, the rotation of which is transmitted through pinion gears 47 to spindle 42, and thence to a conventional wire wrapper bit 52.

Wire wrapper bit 52 is supported for conjoined rotation with spindle 42 within a tubular member 53. Tubular member 53 is fixedly secured within spindle housing extension 37 by means of a collet 54 and a chuck 55, which is turned upon threads 56 formed in the outer peripheral surface of spindle extension 37. Chuck 55, when turned upon threads 56, engages the longitudinally slotted end portion of the collet and, in cooperation with the internally beveled end portion of spindle extension 37, squeezes the collet end into tight clamping relationship with tubular member 53. To prevent rotation and provide location of tubular member 53, a drive screw 57 is driven into a drilled hole in the wall of spindle housing extension 37 and engages a groove in tubular member 53. Bit 52 is provided with a longitudinal bore 58 extending inwardly from the forward end of the bit, which bore is adapted to receive a member (not shown), such as a terminal, to which a wire (not shown) is to be wrapped. The outer peripheral surface of bit 52 is provided with a longitudinal groove 59 which is adapted to receive the wire to be wrapped. To facilitate the insertion of the wire into groove 59, the end of tubular member 53 is outwardly flared at 60. Bit 52 has an enlarged head end 61 which is provided with a cut-out portion to form a projecting tang 62 having a flat side. Head end 61 is slidably receivable in a stepped depression 63 formed in the end of spindle 42 with a flat side of tang 62 engaging a flat wall 64 formed in depression 63 so that rotation of spindle 42 is transmitted to bit 52.

In operation of the wire wrapper tool as thus far described, actuation of trigger 33 opens valve 27 to admit pressurized air to motor 13 thereby causing operation of the motor and the rotation of the rotor shaft 50. Rotation of rotor shaft 50 is transmitted, through pinion gears 47, to spindle 42. Rotation of spindle 42 is transmitted to bit 52 to thereby cause a wire (not shown) inserted in groove 59 to be wrapped around a terminal (not shown) inserted in bore 58. Obviously, the motor will operate until trigger 33 is released and in absence of some means for stopping the bit in a desired position upon release of trigger 33, groove 59 will lie, after each successive operation, in various positions with respect to tubular member 53 depending upon inertia, friction and other factors; that is the bit 52 will not stop in a "home" or starting position.

Figure 2:
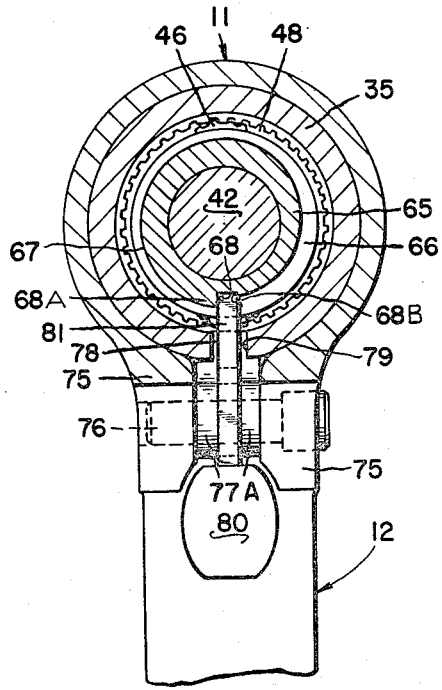
FIG. 2 is a sectional view taken along line 2—2 of FIG. 1, somewhat enlarged.
Figure 3:
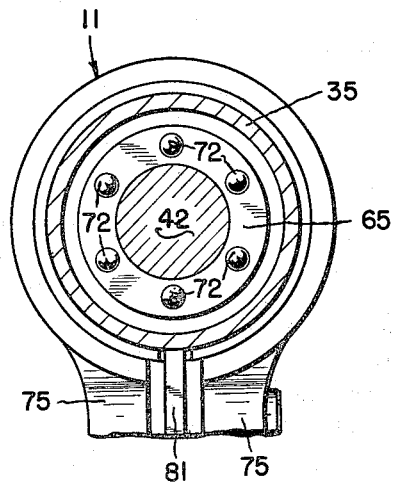
FIG. 3 is a view in section taken substantially along line 3—3 of FIG. 1, somewhat enlarged.

In order to provide for return of bit 52 to a desired "home" position after each operation of wire wrapping tool 10, a stop means in the form of a cam sleeve 65 is disposed on spindle 42 in abutment against the flanged end 66 of the spindle. As best shown in FIG. 2, the outer peripheral surface of the cam sleeve 65 is provided with a camming surface 67 which spirals inwardly and terminates at a slot 68 forming stop shoulders 68A and 68B. Sleeve 65 is rotated by spindle 42 through a shock absorbing means 69. The shock absorbing means 69 includes a plate 70 which is spline connected at 71 to spindle 42 adjacent sleeve 65 so that plate 70 is rotatively driven by the spindle. Plate 70 is provided with a plurality of circumferentially spaced arcuate depressions, each of which is adapted to receive therein a portion of a ball 72. The end surface of sleeve 65 is provided with similar arcuate depressions in each of which another portion of a ball 72 is receivable. Balls 72 are retained in their respective depressions in plate 70 and sleeve 65 by a Belleville spring 74 disposed between plate 70 and bearing 43, which spring urges plate 70 in a direction toward sleeve 65. In addition to transmitting rotation from spindle 42 to sleeve 65, the shock absorbing means 69 functions to prevent fracture of trigger 33 as hereinafter discussed.

Figure 5:
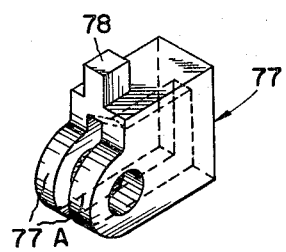
FIG. 5 is a view in perspective of the locking key for securing the spindle housing in the tool housing.

Trigger 33 of trigger assembly 34 is pivotally mounted between a pair of spaced ears 75 (see FIG. 2), formed integrally with housing 11 and handle 12, by means of a pivot pin or bolt 76 extending through registered holes in the ears 75 and trigger 33. Also disposed between ears 75 and supported by bolt 76 is a key 77. As best shown in FIG. 5, key 77 has two spaced leg portions 77A between which trigger 33 is receivable.

Key 77 is also provided with an upwardly extending tab 78 which projects into an elongated slot 79 formed in the wall of spindle housing 35. Key 77 abuts handle 12 and the underside of spindle housing 35, with tab 78 abutting the end wall of slot 79, so that spindle housing 35 is prevented from endwise movement in a direction out of the forward end of housing 11 and restrained against rotation by abutment of tab 78 against the sides of slot 79.

Trigger 33 is constructed to have a finger grip portion 80 and a cam follower portion 81 extending upwardly through slot 79 and into engagement with camming surface 67 of sleeve 65. Trigger 33 is maintained in positive contact with camming surface 67 by coil spring 82 which is disposed around the portion of valve stem 26 projecting from handle 12 and bears at one end against trigger 33 and at the opposite end against valve cage 21. It is not essential that spring 82 be employed to bias trigger 33 against the camming surface 67, since air pressure acting against valve head 27 will also act to constantly bias valve stem 26 against trigger 33. It will be seen that trigger 33, when in the released position as shown, engages stop shoulder and slot 68 and prevents rotation of sleeve 65 in either direction and, through shock absorbing means 69, spindle 42. By halting rotation of spindle 42, rotation of bit 52 is also stopped. Since the bit 52 and its groove 59 are in a fixed angular position with respect to stop shoulders 68A and 68B, engagement of trigger cam follower portion 81 and stop shoulder 68A positions the bit 52 and its groove 59 always in the same position. If in operation, trigger 33 is released so that its cam follower portion 81 immediately engages stop shoulder 68A, the resultant impact might be sufficient to fracture trigger member 33. This failure is avoided by the shock absorbing means 69 which absorbs the forces of impact by allowing limited relative rotation between sleeve 65 and spindle 42 as balls 72 tend to be forced out of their respective depressions in plate 70 and sleeve 65 against the tension of Belleville spring 74.

In operation of the wire wrapping tool 10 herein fully described, actuation of trigger 33 pivots cam follower portion 81 thereof out of engagement with stop shoulders 68A and 68B and camming surface 67 of sleeve 65 to thereby release the sleeve and spindle 42 for rotation. Simultaneously therewith, valve stem 26 is axially moved to unseat valve head 27 to thereby allow flow of compressed air from chamber 23, through counterbore 25, ports 31, annular groove 30, and into passageway 14. From passageway 14, the compressed air flows to air motor 13 to cause operation thereof. Spent compressed air is discharged from air motor 13 through passageway 15, annular groove 29, and thence into and through exhaust passageway 20 to atmosphere. Upon the operation of motor 13, rotor shaft 50 rotates spindle 42 through intermeshing gears 49, 47 and 48. Rotation of spindle 42 is transmitted through splines at 71 to plate 70 and, from plate 70, to cam sleeve 65 through balls 72. Rotation of spindle 42 also effects rotation of bit 52 so that a wire (not shown) inserted in groove 59 is wrapped about a terminal (not shown) inserted in bore 58. Upon release of trigger 33, the cam follower portion 81 thereof, under the urging of spring 82 and the urging of valve stem 26 by air pressure acting against valve head 27, reengages camming surface 67 of sleeve 65. Since the trigger and valve stem 26 are so constructed and arranged that valve head 27 is only in a fully closed position (seated on the valve seat formed around the peripheral edge of counterbored portion 25) when cam follower 81 of trigger 33 is in slot 68 and abutment against stop shoulders 68A and 68B, air continues to flow to the air motor to operate the same and continue rotation of spindle 42 and sleeve 65 until stop shoulder 68A comes into abutment against cam follower portion 81 of trigger 33. Because the camming surface 67 is in the nature of an inclined plane, as best illustrated diagrammatically in FIG. 4, cam follower portion 81 of trigger 33 allows the trigger to pivot clockwise, as viewed in FIG. 1, thereby permitting valve head 27 to gradually move toward a closed position. Movement of valve head 27 toward a closed position, gradually reduces flow of compressed air to air motor 13 thereby progressively reducing the speed of the air motor and finally stopping operation of air motor 13 substantially simultaneously with the engagement of cam follower 81 with stop shoulder 68A and the entrance of follower 81 into slot 68. This reduction in the speed of air motor 13 reduces the shock of impact when cam follower 81 engages stop shoulder 68A thereby further minimizing the possibility of fracture of trigger 33.

Figure 4:
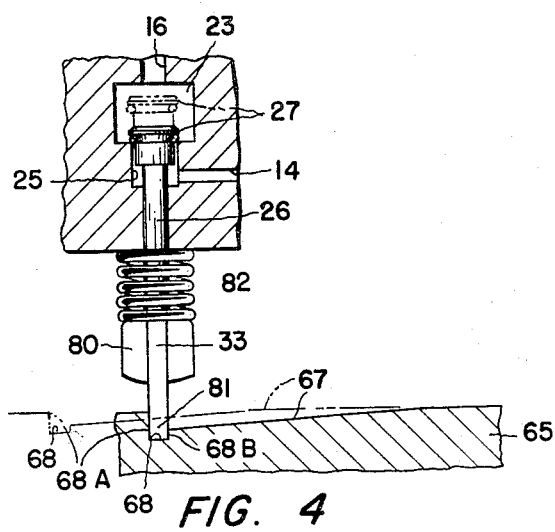
FIG. 4 is a somewhat schematic illustration showing the cooperative relationship between the cam, cam follower and throttle valve in accordance with the present invention.

As best can be understood by referring to FIG. 4, in the event trigger 33 is released in relation to the angular position of slot 68 and stop shoulder 68A so as to almost immediately engage the stop shoulder 68A which impact may be severe enough to cause cam sleeve 65 to rebound before follower 81 can enter slot 68, the cam follower 81 will ride on the camming surface 67 to reopen valve head 27 (shown by dot-dash lines in FIG. 4) and maintain the valve head open to operate air motor 13 which in turn will rotate the spindle and cam sleeve 65 in the desired direction of rotation to cause stop shoulder 68A to reengage cam follower portion 81 of trigger 33 and permit the latter to enter slot 68.

From the foregoing description it can be seen that the present invention provides a novel wire wrapping tool of simplified construction which automatically positions the bit in a desired starting position after each successive operation of the tool. It is a wire wrapping tool in which the probability of a "pig tail" type of end wrap is eliminated. Furthermore, a pneumatically operated wire wrapping tool of greater efficiency is provided than heretofore known pneumatically operated wire wrapping tools because the air motor is continuously driveably connected to the spindle and therefore wire wrapping commences substantially simultaneously with operation of the air motor.

Although but one embodiment of the invention has been illustrated and described in detail, it is to be expressly understood that the invention is not limited thereto. Various changes can be made in the arrangement of parts without departing from the spirit and scope of the invention as the same will now be understood by those skilled in the art. For example, cam follower portion 81 may be constructed as a member separate from trigger grip portion 80 with both members pivotally mounted on bolt 76 and in overlapping abutting relationship to each other. A U-shaped spring, straddling bolt 76 and bearing against the two members and the handle, may be employed in place of spring 82 to cause the two members to function as a unitary member as well as urge the cam follower member into engagement with the camming surface 67 of sleeve 65.

We claim:
1. In a wire wrapping tool having a pneumatic motor for rotating a bit adapted to receive a wire to be wrapped, means for positioning the bit in a preselected position after each operation of the tool, said means comprising a spindle in continuous driveable connection with the pneumatic motor to be rotated by the latter, said bit being connected to the spindle to be rotated by said spindle, a valve supported for movement to open and closed positions to control operation of said motor, said valve being biased in a normally closed position, a stop means fixed for conjoined rotation with said spindle, said stop means including a spirally formed circumferential camming surface extending progressively inwardly toward the axis of said spindle and terminating in a shoulder, a lever means including a cam follower disposed with the cam follower engaging said camming surface and said shoulder to prevent rotation of said spindle, said lever means being pivotally supported for movement in one direction to substantially simultaneously disengage said cam follower from the camming surface and said shoulder to allow rotation of said spindle and move said valve to an open position to effect operation of said motor, and in the opposite direction, reengage said cam follower with the camming surface, said shoulder being dimensioned so that upon said cam follower abutting said shoulder the valve is allowed to fully close.

2. In a wire wrapping tool having a pneumatic motor for rotating a bit adapted to receive a wire to be wrapped, means for positioning the bit in a preselected position after each operation of the tool, said means comprising, a spindle, connecting means for continuously maintaining driveable connection with the pneumatic motor, said bit being connected for conjoined rotation with said spindle, a valve supported for movement to open and closed positions to control operation of said motor, said valve being biased in a normally closed position, a contrl means operatively associated with said valve so as to move with said valve between the open and closed positions of said valve, and camming means including a stop member being operatively associated for conjoined rotation with said spindle, said control means including a cam follower adapted to engage said camming means and said stop member to prevent rotation of said spindle when the valve is in a fully closed position, said control means being operative in one direction to substantially simultaneously disengage said cam follower from said camming means and said stop member and actuate said valve to a fully open position, and operative in the opposite direction to reengage said cam follower with said camming means, said camming means being so formed so that the cam follower while in engagement therewith gradually moves the control means in a direction to allow the valve to gradually move to a closed position and to fully close when said cam follower impinges against said stop member.

3. In a wire wrapping tool having a pneumatic motor for rotating a bit adapted to receive a wire to be wrapped, means for positioning the bit in a predetermined position after each operation of the tool, said means comprising, a spindle, drive means for providing a continuous driveable connection between the spindle and the pneumatic motor to rotate said spindle, said spindle being connected to said bit to provide conjoined rotation of said spindle and bit, a throttle valve supported for linear movement between open and closed positions to control flow of motive fluid to said motor, said throttle valve being biased in a normally closed position, a camming means including a circumferential camming surface terminating in a shoulder operatively associated with said spindle for conjoined rotation therewith, and a manually operative trigger member disposed to engage said camming surface and said shoulder and said throttle valve, said trigger member being pivotally supported for manual movement in one direction to substantially simultaneously disengage from said camming surface and said shoulder to allow rotation of said spindle and linearly move said valve to an open position to allow operation of said motor, and movement in the opposite direction to reengage said camming surface and allow said valve to linearly move to a fully closed position substantially simultaneously with said trigger member abutting said shoulder.

4. The apparatus of claim 3 wherein said camming means is a cylindrical member superimposed over a portion of the spindle and connected to said spindle for conjoined rotation with the latter and wherein said camming surface and said shoulder are formed in the peripheral surface of said cylindrical member.

5. A wire wrapping tool comprising, a pneumatic motor, a bit, a spindle in continuous driveable connection with said pneumatic motor to be rotated by the latter and driveably connected to said bit to provide conjoined rotation of the spindle and bit, a valve actuable to control flow of motive fluid to said motor to control operation thereof, a collar disposed to extend over at least a portion of said spindle, means for connecting said spindle and said collar together to provide conjoined rotation of said collar and spindle, said collar having a camming surface formed on the outer peripheral surface of said collar and terminating in an abutment, and a manually operable and releaseable means cooperatively associated with said camming surface and abutment and said valve to prevent rotation of said spindle and bit and operation of said motor, said manually operable and release means upon actuation being effective to allow substantially simultaneous operation of said motor and rotation of said spindle and upon release being effective to substantially simultaneously stop rotation of said spindle and operation of said motor.

6. In a wire wrapping tool having a pneumatic motor for rotating a bit adapted to receive a wire to be wrapped, means for positioning the bit in a predetermined position after each operation of the tool, said means comprising a spindle, drive means for providing a continuous driveable connection between the spindle and the pneumatic motor to rotate said spindle, said spindle being connected to said bit to provide conjoined rotation of said spindle and bit, a throttle valve adapted to be slid to closed and open positions for controlling flow of motive fluid to said motor and the operation of the latter, a spring to bias said throttle in a normally closed position, a cam element secured to said spindle for rotation with said spindle, said cam element having a cam surface spiraling in a direction inwardly toward the axis of spindle and terminating in a radially extending abutment, a trigger pivotally mounted between said valve and said cam element, said trigger having a cam follower portion adapted to engage said cam surface and said abutment and another portion adapted to engage and be movable with said valve, said trigger being urged by said valve to provide engagement of said cam follower portion with said cam surface, said trigger being constructed and arranged to provide upon pivotal movement against the urging of said valve for disengagement of said cam follower portion from said cam surface and said abutment to allow rotation of said spindle and substantially simultaneously slide said throttle valve to an open position to effect operation of said motor, and upon pivotal movement in a direction as urged by said valve provide for engagement of said cam follower portion with said cam surface and said abutment substantially simultaneously with the valve reaching a closed position to cease operation of said motor.

References Cited by the Examiner
UNITED STATES PATENTS

| | | | |
|---|---|---|---|
| 2,649,121 | 8/53 | Reck | 192—148 |
| 2,743,503 | 5/56 | Mallinai. | |
| 2,884,685 | 5/59 | Bos et al. | |
| 2,927,741 | 3/60 | Moore et al. | |

DAVID J. WILLIAMOWSKY, *Primary Examiner.*

FRANK SUSKO, *Examiner.*